United States Patent
Kim et al.

(10) Patent No.: US 8,363,113 B2
(45) Date of Patent: Jan. 29, 2013

(54) TERMINAL AND BLOGGING METHOD THEREOF

(75) Inventors: Suk-un Kim, Suwon-si (KR); Dong-hyun Roh, Yongin-si (KR); Yeong-geol Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 766 days.

(21) Appl. No.: 12/482,943

(22) Filed: Jun. 11, 2009

(65) Prior Publication Data

US 2010/0149347 A1 Jun. 17, 2010

(30) Foreign Application Priority Data

Jun. 24, 2008 (KR) .................. 10-2008-0059592

(51) Int. Cl.
*H04N 5/225* (2006.01)
*H04N 9/04* (2006.01)
*H04N 5/222* (2006.01)
*G06K 9/00* (2006.01)

(52) U.S. Cl. ............... 348/207.1; 348/333.01; 382/115

(58) Field of Classification Search ............ 715/733; 348/333.01–333.11, 207.1, 211.99, 333.99; 382/115–172
See application file for complete search history.

(56) References Cited

U.S. PATENT DOCUMENTS

| | | | |
|---|---|---|---|
| 6,535,243 B1 * | 3/2003 | Tullis ........................ 348/207.1 |
| 7,069,003 B2 * | 6/2006 | Lehikoinen et al. ....... 455/414.2 |
| 7,103,506 B2 * | 9/2006 | Friedrich et al. .............. 702/184 |
| 7,760,917 B2 * | 7/2010 | Vanhoucke et al. ........... 382/115 |
| 8,004,580 B2 * | 8/2011 | Yoo ............................ 348/231.2 |
| 8,270,953 B2 * | 9/2012 | Klassen et al. ............. 455/414.1 |
| 2002/0063723 A1 * | 5/2002 | Hirono ......................... 345/619 |
| 2004/0046779 A1 * | 3/2004 | Asano et al. .................. 345/716 |
| 2004/0051784 A1 * | 3/2004 | Ejima et al. ............. 348/207.99 |
| 2005/0185835 A1 * | 8/2005 | Matsugu et al. .............. 382/159 |
| 2005/0253870 A1 * | 11/2005 | Kotake et al. ................. 345/633 |
| 2006/0004280 A1 * | 1/2006 | Kotake et al. ................. 600/414 |
| 2006/0018506 A1 * | 1/2006 | Rodriguez et al. ........... 382/100 |
| 2006/0115108 A1 * | 6/2006 | Rodriguez et al. ........... 382/100 |
| 2006/0270387 A1 * | 11/2006 | Hirata et al. .................. 455/411 |
| 2006/0284981 A1 * | 12/2006 | Erol et al. .................. 348/207.1 |
| 2007/0038944 A1 * | 2/2007 | Carignano et al. ........... 715/757 |
| 2007/0047844 A1 * | 3/2007 | Watanabe et al. ............. 382/305 |
| 2007/0154115 A1 * | 7/2007 | Yoo .............................. 382/305 |
| 2007/0206101 A1 * | 9/2007 | Ueno et al. ............... 348/211.99 |
| 2008/0024632 A1 * | 1/2008 | Otsuka ......................... 348/294 |
| 2008/0147824 A1 * | 6/2008 | Hendrey ....................... 709/218 |
| 2008/0189659 A1 * | 8/2008 | Krutzler ....................... 715/838 |
| 2009/0285444 A1 * | 11/2009 | Erol et al. .................... 382/100 |

* cited by examiner

*Primary Examiner* — Nhan T Tran
*Assistant Examiner* — Tuan Le
(74) *Attorney, Agent, or Firm* — NSIP Law

(57) ABSTRACT

Disclosed are a terminal and a blogging method thereof. In the blogging method, a preview image displayed through a camera is recognized to acquire information of the preview image. It is determined whether there is a stored blog that has background information that is identical to the information of the preview image, and if a stored blog has background information that is identical to the information of the preview image, contents of the stored blog that uses the preview image as its background are imported and the imported contents are displayed on the preview image.

11 Claims, 7 Drawing Sheets

TERMINAL AND BLOGGING METHOD THEREOF

CROSS-REFERENCE TO RELATED APPLICATION

This application claims the benefit under 35 U.S.C. §119(a) of a Korean Patent Application No. 10-2008-0059592, filed on Jun. 24, 2008, the disclosure of which is incorporated herein in its entirety by reference for all purposes.

BACKGROUND

1. Field

The following description relates to a terminal and a method of blogging using the terminal.

2. Description of the Related Art

Making blogs is the new trend to easily express one's personality and lifestyle through is internet media. The word "blog" is a contraction of "web" and "log" and has been named since it is shown in the form of a diary in which a new post is put on the top of a list. The blog is a kind of personal media having various formats, such as personal publication, personal broadcasting, community, etc., which allows users to post diaries, columns, articles, etc. freely according to their interests.

A blog can be managed using a terminal. Blogging using a terminal could not have given special feelings or pleasure to users so far since it is similar to blogging using a computer.

Meanwhile, when people have a meeting at a specific place, for example, at a café, they may want to take a picture at the café and post the picture, passages, etc. on a certain place (for example, a board) of the café in order to recollect the meeting, events, friends and the like at that time when again visiting at the café in the future.

SUMMARY

In one general aspect, a terminal is used for blogging by capturing a preview image through a camera at the terminal; recognizing the preview image including acquiring information of the preview image; and determining whether a stored blog includes background information that is identical to the acquired information of the preview image. If it is determined that stored blog background information is identical to the information of the preview image, contents including one or more content items of the stored blog that uses the preview image as a background are imported and the imported contents are displayed on the preview image on a to display of the terminal.

Implementations may include one or more of the following features. For example, the information of the preview image may be acquired by recognizing the preview image through augmented reality (AR) processing. The information of the preview image may be acquired by identifying a marker of the preview image.

After the information of the preview image is acquired, it is determined whether a blog creation mode is selected. If it is determined that a blog creation mode is selected, selected contents are received and a blog is created by displaying the selected contents and allowing adjustment of the displayed contents; and the created blog is stored. The blog may be created by determining whether contents are selected; if the contents are selected, arranging the selected contents randomly on the preview image; and adjusting at least one of a position, size, and angle of each content item of the contents on the preview image. The blog may be stored by storing the information of the preview image and information of the adjusted contents. The selected contents may be displayed on the preview image by displaying the contents in their stored forms on the preview image; determining whether the blog creation mode is selected after displaying the contents; and returning to the creating of the blog if the blog creation mode is selected.

In another general aspect, a terminal includes a camera configured to display a preview image; a storage medium configured to store contents that includes one or more content items, contents information including at least one of a position, size, and angle of the contents in a predetermined blog, and background information of the predetermined blog; and a controller. The controller is configured to recognize the preview image, acquire information of the preview image, search the storage medium for background information, and if a blog having background information that is identical to the information of the preview image is found in the storage medium, import the blog's contents that uses the preview image as a background and display the contents of the blog in their stored forms on the preview image.

Implementations may include one or more of the following features. For example, the controller may include an augmented reality processor. The augmented reality processor may include a real scene recognizer configured to perform a function of the camera to display the preview image and identify a marker of the preview image; a virtual object creator configured to receive position tracking information of the real scene recognizer and create the selected contents is as a virtual object; and a mixer configured to mix the preview image with the virtual object.

The controller may be configured to acquire the information of the preview image by identifying the marker of the preview image.

The controller, if a blog creation mode is selected, may be configured to create the blog by receiving selected contents, displaying the selected contents, and allowing adjustment of the displayed contents.

If the contents are selected, the controller may be configured to arrange the selected contents randomly on the preview image.

The terminal may include an input unit configured to adjust at least one of a position, size, and angle of each content item of the contents on the preview image.

The following description relates to a terminal that arranges content on a preview image acquired through a camera to thus create a blog, and if the preview image corresponds to a background of a stored blog, imports and arranges pre-stored contents on the preview image. The following description also relates to a method of blogging using the terminal.

The following description also relates to a terminal that can create, store, and display a blog, in a different way from a computer, and a method of blogging using the terminal.

The following description also relates to a terminal that can blog using a real environment as a background and contents as a virtual object through augmented reality processing, and a method of blogging using the terminal.

The following description also relates to a terminal that, if a preview image acquired through a camera is identical to background information of a stored blog, can display pre-stored contents on the preview image, and a method of blogging using the terminal.

According to an exemplary aspect, there is provided a method of blogging using a terminal. In the blogging method, a preview image is captured through a camera, the preview is image is recognized, and information of the preview image is acquired. Next, it is determined whether there is background information of a stored blog that is identical to the information of the preview image. If there is the background information of the stored blog that is identical to the information of the preview image, contents of the stored blog that uses the preview image as a background are imported and the imported contents are displayed on the preview image.

According to another exemplary aspect, there is provided a terminal including a camera, a storage, and a controller. The camera displays a preview image. The storage stores contents, contents information including at least one of a position, size, and angle of contents in a predetermined blog, and background information of the predetermined blog. The controller recognizes the preview image to acquire information of the preview image, if background information of a blog that is identical to the information of the preview image is found in the storage, imports contents of the blog that uses the preview image as a background, and displays the contents of the blog in their stored forms on the preview image.

Accordingly, there is provided an intrinsic interface using augmented reality during blogging. Also, easy blogging is implemented that posts contents such as pictures and text as a virtual object as if posting the contents on a real board, etc. Furthermore, by giving the feeling as if contents are attached to a real board, etc., a new experience is provided to users.

Other features and aspects will be apparent from the following detailed description, the drawings, and the claims.

BRIEF DESCRIPTION OF THE DRAWINGS

Throughout the drawings and the detailed description, unless otherwise described, the same drawing reference numbers refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

In the following description, the word "blog" is a contraction of "web" and "log" and has been named since it is shown in the form of a diary in which a new post is put on the top of a list. The word "blogging" means a process of maintaining a blog as described above. That is, "blogging" includes all activities of creating/decorating a blog, putting commentaries on other's blogs, etc.

Also, the word "contents" means all information that a terminal's user can store, select and check as necessary. Contents can include one or more content items. Contents can include, for example, image files, text files, etc.

A terminal (which is sometimes referred to as a computer terminal) is an electronic or electromechanical hardware device that is used for entering data into, and displaying data from, a is host computer or a host computing system. The function of a terminal can be confined to display and input of data; though a terminal with significant local programmable data processing capability may be called a "smart terminal" or fat client. A terminal that depends on the host computer for its processing power is called a thin client. A personal computer can run software that emulates the function of a terminal, sometimes allowing concurrent use of local programs and access to a distant terminal host system.

Terminals can include cameras to give users convenience, and can include information communication devices, multimedia devices, and applications thereof, such as mobile terminals, mobile phones, wired/wireless phones, portable multimedia players (PMPs), personal digital assistants (PDA), smart phones, or MP3 players.

Figure 1:
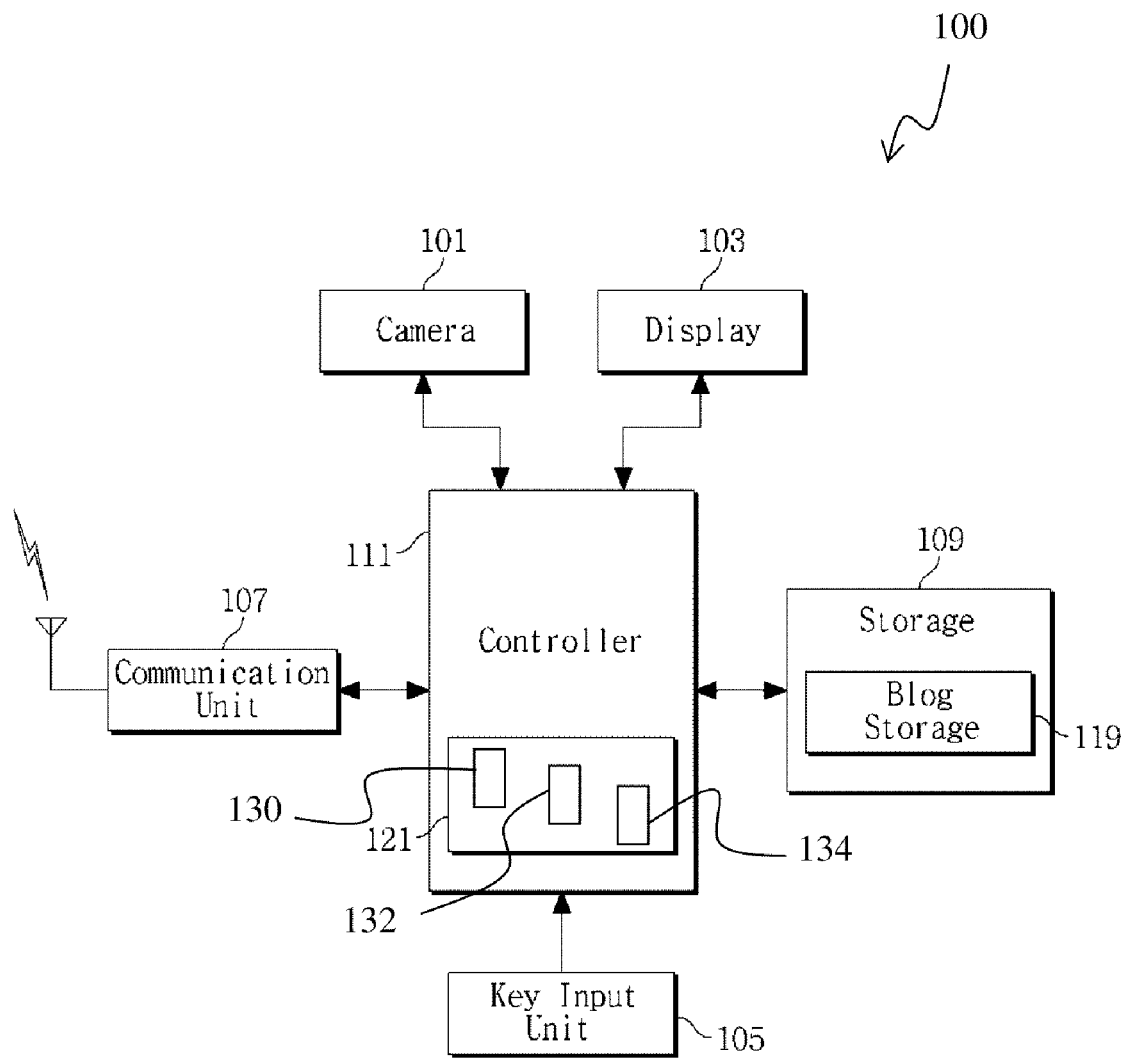
FIG. 1 is a block diagram of an exemplary terminal having a blogging function.

Referring to FIG. 1, a terminal 100 includes a camera 101, a display 103, a key input unit 105, a communication unit 107, a storage 109, and a controller 111.

The camera 101 photographs objects and generates image signals. The camera 101 includes a camera sensor for converting optical signals into electrical signals and a signal processor for converting analog image signals acquired by the camera sensor into digital signals. The camera 101 functions as a real scene recognizer of an augmented reality processor 121, as will be described later with reference to FIG. 2.

The display 103 displays various information about the state and operation of the terminal 100. The display 103 may display a preview image acquired by the camera 101. At to this time, if a blog creation mode is selected, the display 103 arranges contents selected by a user randomly on the preview image. For example, the display 103 arranges the selected contents in the center of the preview image. Also, the display 103 may display indicators for adjusting the locations, angles, sizes, etc. of the contents.

If a background ID of a stored blog corresponding to information (that is, a preview is image ID) of the preview image is found, the display 103 displays contents of the blog in their stored forms on the preview image. The display 103 may be a liquid crystal device (LCD). In this case, the LCD includes an LCD controller, an LCD display device, etc. If the LCD is implemented in the form of a touch screen, the display 103 may function as an input unit.

The key input unit 105 receives a user's manipulation signals to control the operation of the terminal 100. The key input unit 105 performs manipulations, such as driving the camera 101, selecting a blog creation mode, selecting contents, adjusting contents, storing a blog, importing a stored blog, etc.

The communication unit 107 can be a radio frequency (RF) unit for wireless communications. The communication unit 107 includes an RF transmitter for raising and amplifying the frequencies of signals to be transmitted, and an RF receiver for low-noise amplifying and lowering the frequencies of received signals. The communication unit 107 may store a blog created in a blog server by connecting to Wireless Application Protocol (WAP), etc. Also, the communication unit 107 may import contents of the stored blog from the blog server by connecting to WAP, etc.

The storage 109 stores applications and information related to operations of the terminal 100. The storage 109 may further include a blog storage 119. The blog storage 119 stores information (for example, background information and contents information) of a created blog. The blog storage 119 may store a name of the created blog according to a user's input. Blog information may be stored in the blog storage 119 in the form of the following Table.

TABLE 1

| Background Information | Contents | Contents Information |
|---|---|---|
| ID 1 | Image 1 | Location Value, Size Value |
|  | Image 2 | Location Value, Size Value, Angle Value |
|  | Text 1 | Location Value, Size Value, Angle Value |
|  | ... | ... |
| ID 2 | Image 3 | Location Value, Size Value, Angle Value |
|  | Text 2 | Location Value, Size Value |
|  | ... | ... |
| ... | ... | ... |

The blog storage 119 stores background information and contents information for each blog, as shown in Table 1. Here, the background information is background IDs and is used to recognize preview images transferred from the real scene recognizer of the camera 101. The background information may be markers (for example, barcodes) recognizable as preview image information by the real scene recognizer to know where places corresponding to the preview images are located. That is, the blog storage 119, instead of capturing and storing the background of the created blog, stores only its background ID.

Also, the contents information is information of contents stored in the created blog, and includes the type, location value, size value, angle value, etc. of each content item. In other words, the contents information is information about the types, sizes and angles of contents. Through the contents information, where each content item is located in the background of the to corresponding blog, the size of each content item, and the angle of each content item can be recognized.

The storage 109 stores the contents. Here, the contents may be image files, text files, etc. The contents may be stored in the storage 109 to create a blog, or according to a user's needs.

The controller 111 controls the operations of the components of the terminal 100. The controller 111 controls a blogging function. The controller 111 compares information of a preview image acquired by the camera 101 with background IDs stored in the blog storage 119 of the storage 109. Or, the controller 111 may compare the information of the preview image with background IDs stored in the blog server by driving the communication unit 107 to connect to WAP, etc. If no background ID corresponding to the preview image information is found in the blog storage 119 and the blog creation mode is selected, the controller 111 allows a user to select contents. The controller 111 adjusts contents selected by the user. For example, the controller 111 adjusts the locations, sizes, inclined angles, etc. of the contents on the preview image.

When receiving a request for storing the created blog, the controller 111 stores the information (a background ID, and contents information such as the locations, sizes, angles, etc. of the contents) for the preview image recognized by the camera 101 in the blog storage 119 of the storage 109. At this time, the controller 111 may store the background ID and contents information of the corresponding blog in the blog server through WAP by driving the communication unit 107.

Meanwhile, if a background ID matching the preview image information is found in the blog storage 119, the controller 111 imports contents corresponding to the preview image from the blog storage 119. Then, the controller 111 displays the contents on the preview image, in to their stored forms, that is, according to the stored locations, sizes and angles of the contents. Also, the controller 11 may inform the user of the fact that the background ID matching the preview image exists in the blog storage 119, or import the stored contents according to the user's request. Or, the controller 111 may import the corresponding contents stored in the blog server through WAP by driving the communication unit 107.

The controller 111 further includes an augmented reality processor 121. The augmented reality processor 121 includes the real scene recognizer 130, a virtual object creator 132, and a mixer 134. Recently, studies on mixed reality are actively conducted to provide a higher reality to users by mixing the virtual environment (VE) with the real environment (RE). The mixed reality is classified into augmented reality (AR) and augmented virtuality (AV) according to whether it is based on the virtual environment or on the real environment. Here, the augmented reality is technology of overlapping a 3-dimensional (3D) virtual object on a real-world, which develops an understanding for the real-world by combining a real-world environment with graphical virtual reality in real-time.

The real scene recognizer recognizes a real-world environment, that is, a preview image acquired by the camera 101. The preview image recognition by the real scene recognizer may be performed by determining whether or not a marker (for example, a barcode) exists on the preview image. For example, the reality scene recognizer recognizes a barcode existing on the preview image relied on the marker-based augmented reality technology. That is, the real scene recognizer identifies the barcode, which may be provided at a specific space of a certain café, thus recognizing where a place corresponding to the preview image is.

The real scene recognizer may recognize the preview image using marker-less model-based augmented reality technology. This technology is applied when no marker corresponding to the café exists, and recognizes a preview image displayed through a camera by creating a 3-dimensional background based on objects, etc. of the preview image. Also, the real scene to recognizer may use maker-less model-free augmented reality technology. This technology is also applied when no marker corresponding to the café exists, like the above-described marker-less model-based augmented reality technology, and recognizes a preview image displayed through a camera based on its schematic outline.

The reality scene recognizer may recognize a preview image by recognizing a logo or name of a place where the preview image is captured. That is, the reality scene recognizer may recognize where a place corresponding to a preview image is by recognizing a café name or logo. The real scene recognizer determines whether a blog has to be created or whether the preview image corresponds to any one of stored background IDs through the preview image recognition.

The virtual object creator performs graphic rendering to create a virtual object through 3D modeling. The virtual object creator performs camera position tracking, senses and tracks the position and movement of the camera 101, and performs rendering of the virtual object. The virtual object created by the virtual object creator is contents selected by a user. Accordingly, the virtual object creator, instead of performing the function of the augmented reality processor 121, recognizes as a virtual object contents selected by a user. In other words, when contents are selected by a user, the virtual object creator generates the contents as a virtual object.

The mixer locates the virtual object created by the virtual object creator on a real scene recognized by the reality scene recognizer, and performs registration to naturally match the virtual object with the real scene.

The mixer implements seamless augmented reality to naturally combine the virtual object with the real scene when locating the virtual object on the real-world environment.

For implementing the seamless augmented reality, the virtual object generator has to consider static errors, rendering errors and dynamic errors. Here, the static errors may be generated in the case where a real-world coordinate system is not identical to a virtual-world coordinate system in the process of matching a virtual environment geometrically to a real-world environment. In order to reduce such static errors, position tracking is important to correctly measure the position and direction of the camera 101. The rendering errors may be generated in the rendering process for naturally matching virtual objects with the real-world environment. In order to reduce such rendering errors, a technique of rendering virtual objects in real time as if processing them in the real-world environment is needed. The dynamic errors appear as a time delay in the process of rendering virtual objects, due to continuous changes of the position and angle of a camera. The dynamic errors may be generated when a real-world image is temporally synchronized with the corresponding virtual image. In order to reduce such dynamic errors, a technique for reducing a time delay is needed.

A blog creation procedure 300 is described next.

Figure 2:
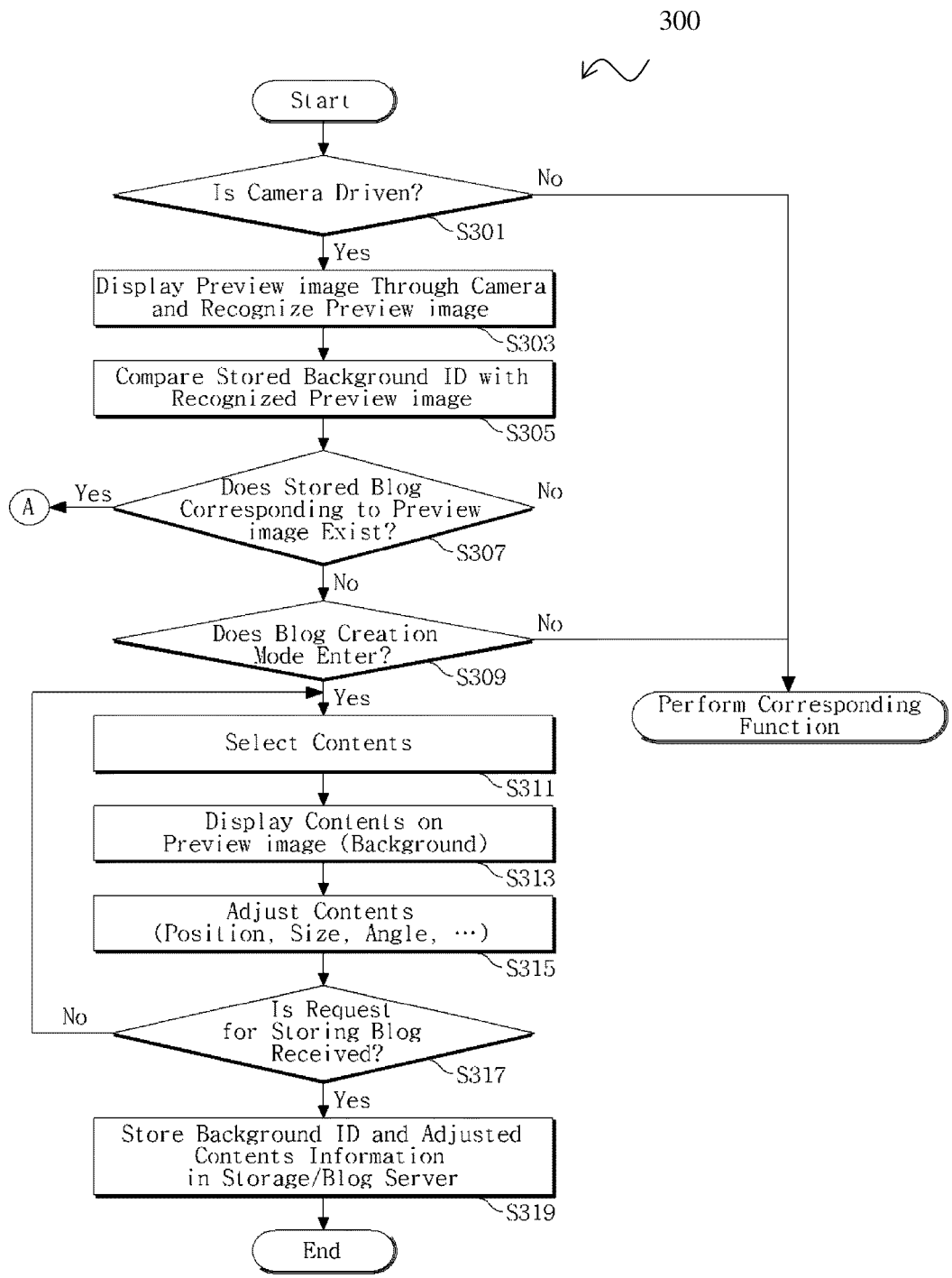
FIG. 2 is a flowchart of an exemplary procedure for creating a blog and blogging using a terminal.
Figure 3A:
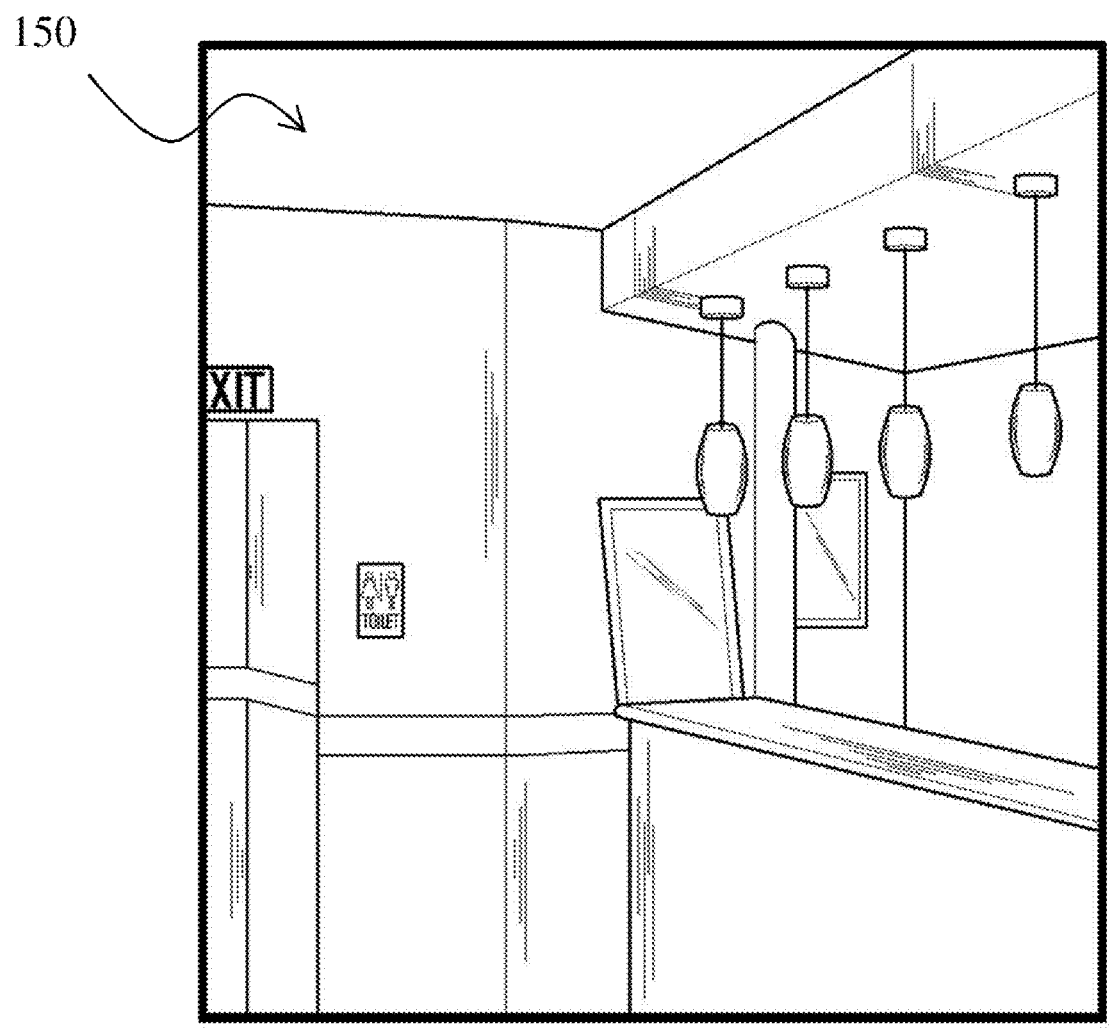
FIGS. 3A, 3B, and 3C are screen shots of exemplary images displayed on the terminal in the blog creation procedure of FIG. 2.

Referring to FIGS. 1 and 2, first, the controller 111 determines whether the camera 101 is driven (operation S301). A user drives the camera 101 to enter a blog creation mode (which will be described later) or to import a stored blog. An exemplary scene 150 is viewed through the user's eyes when the user views a certain space of a café, as shown in FIG. 3A.

Figure 3B:
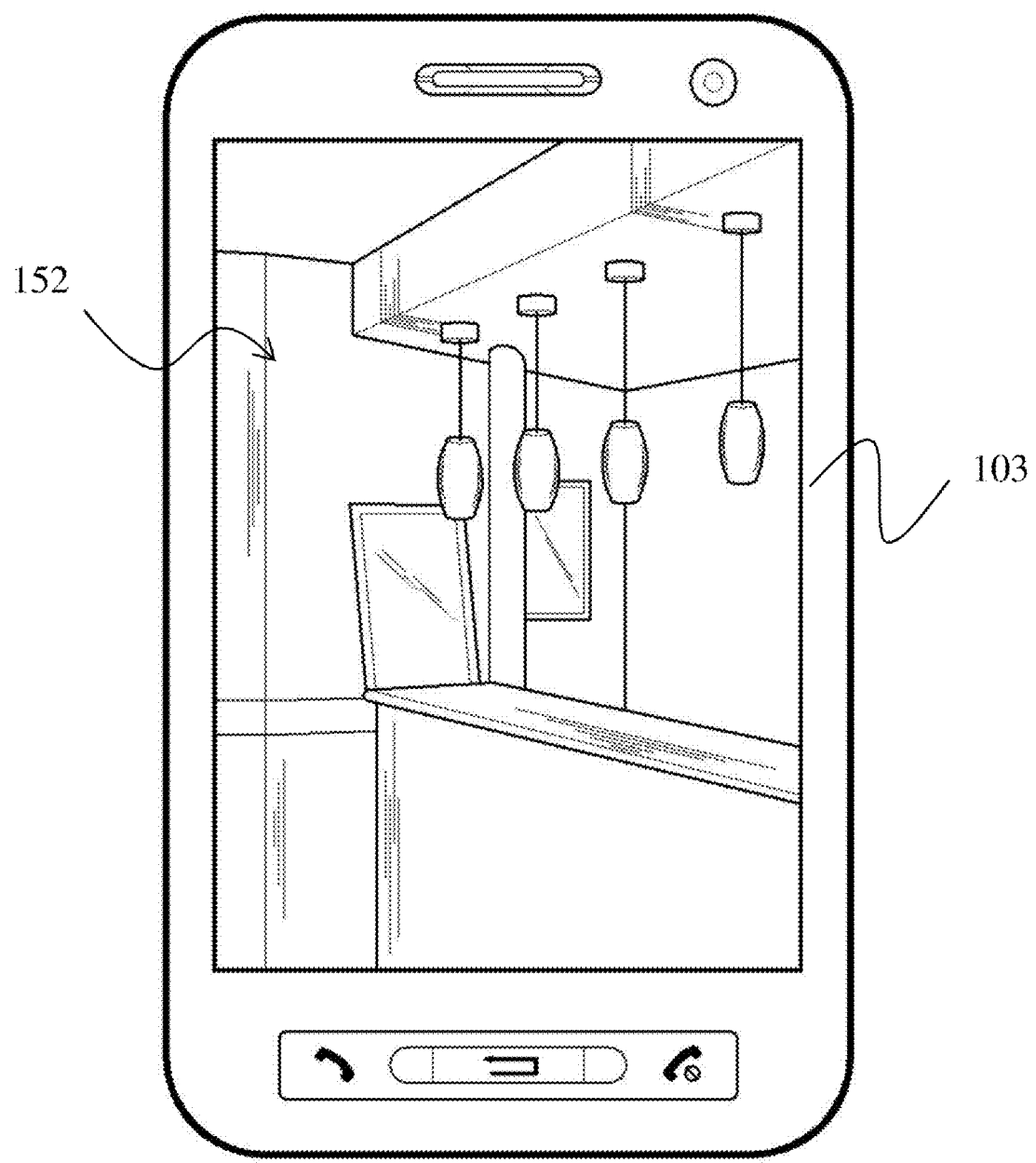

If it is determined that the camera 101 is driven, the controller 111 displays on the display 103 a preview image 152 acquired through the camera 101 and recognizes the preview image 152 (operation S303). An example in which a preview image 152 acquired through the camera 101 is displayed on the display 103 is shown in FIG. 3B. As shown in FIG. 3B, the user may see a specific space 150 through the camera 101 of the terminal 100. The controller 111 recognizes the preview image 152 by identifying a marker (for example, a barcode or a logo) found in the scene 150.

Then, the controller 111 compares information of the preview image 152 with stored background IDs (operation S305). That is, the controller 111 compares the information (that is, the marker) of the preview image 152 recognized in operation S303 with background IDs stored in the blog storage 119 of the storage 109. At this time, the controller 111 may drive the communication unit 107 to compare the information of the preview image 152 with background IDs stored in a blog server through WAP, according to the user's request or automatically. In this case, the controller 111 informs the user of the fact that a WAP connection is established. This is because costs are accounted when a WAP connection is established.

Successively, the controller 111 checks for the presence or absence of a stored blog corresponding to the preview image 152 (operation S307). The controller 111 recognizes the preview image 152 based on the information (marker) such as a barcode, etc., thus acquiring an ID of the preview image 152. The controller 111 compares each background ID of blogs stored in the blog storage 119 of the storage 109 with the preview image's ID, thereby checking the presence or absence of a stored blog corresponding to the preview image 152. If it is determined that a stored blog corresponding to the preview image 152 exists, the controller 111 performs a procedure 500 that is described with reference to FIG. 4.

If it is determined that no blog corresponding to the preview image 152 is found, the controller 111 determines whether a blog creation mode is selected (operation S309). The determination on whether the blog creation mode is selected may be carried out by selecting a blog creation function from among various functions provided as a menu or option when the preview image 152 is displayed. The user may create a blog using the preview image 152 illustrated in FIG. 3B as a background.

When the blog creation mode is selected, the controller 111 recognizes that contents are selected (operation S311). The user selects contents that are to be arranged on the preview image 152 displayed in operation S303 to create a blog. The selection of the contents may be performed automatically when the blog creation mode is selected. Here, the contents can include one or more content items for example, image files or text files, etc. Also, a plurality of to content items of the contents may be selected.

Figure 3C:
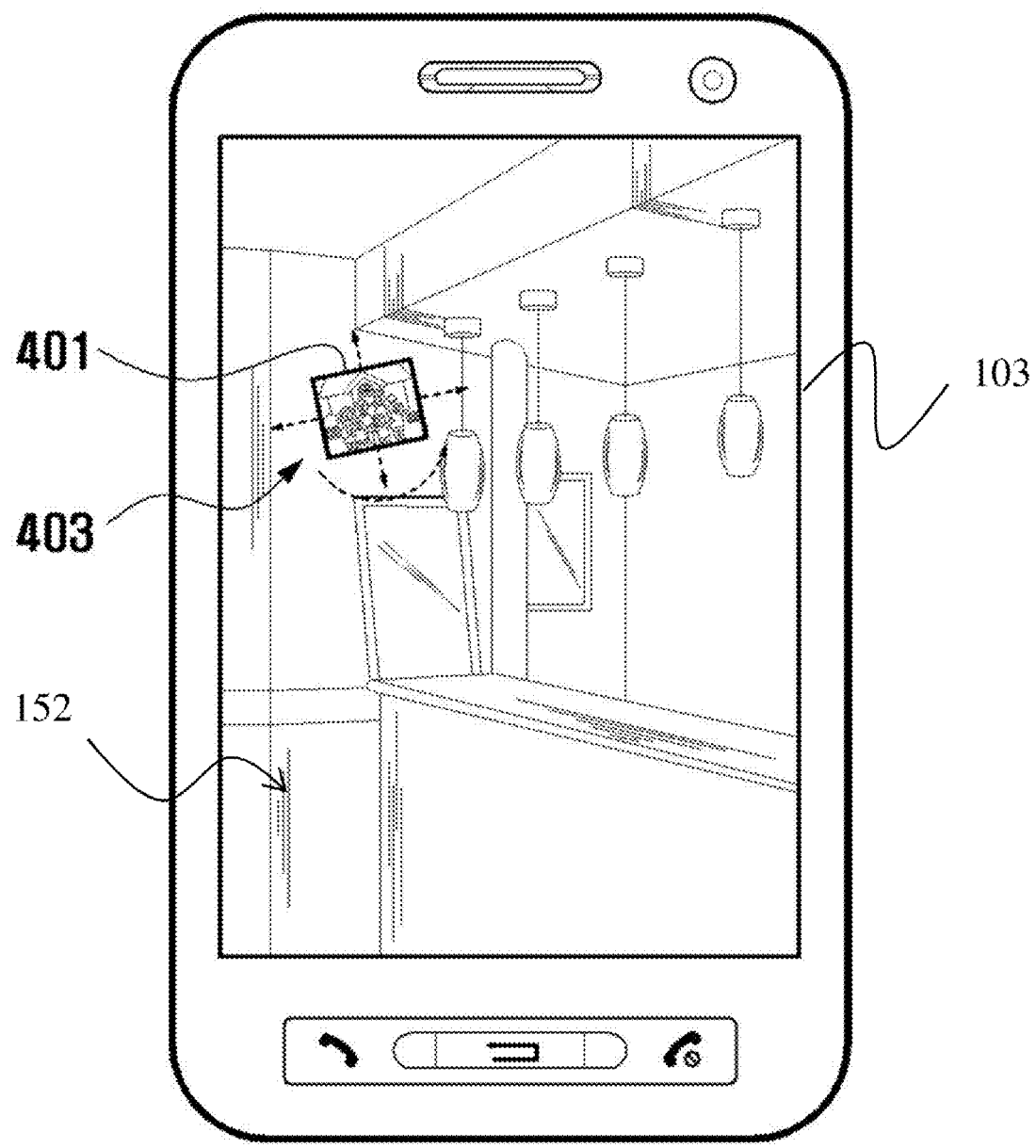

Next, the controller 111 displays the selected contents randomly on the preview image 152 (operation S313). For example, the controller 111 arranges the selected contents in the center of the display 103. The controller 111 displays the selected contents with the dimensions and angles of default values. Here, the controller 111 may display indicators for adjusting the location, angle, size, etc. of contents. An exemplary screen on which the contents 401 selected by the user are displayed on the preview image 152 and indicators 403 are displayed is shown in FIG. 3C. As shown in FIG. 3C, the controller 111 displays the selected contents 401 (which includes in this example one content item) and indicators 403 for adjusting the location, angle and size of the selected contents 401 within the preview image 152, on the display 103. Although FIG. 3C shows a screen on which a single content item is selected, a plurality of content items within contents 401 may be selected and displayed and the indicators 403 may have different shapes and/or sizes.

Next, the controller 111 adjusts one or more features of the contents 401 (operation S315) based on an input from the user to adjust one or more features of the contents 401. The features that can be adjusted include, for example, the location, size, angle, etc. of the contents 401 on the display 103 and the user can adjust these features using the indicators 403. At this time, as described above, the mixer of the augmented reality processor 121 locates the adjusted contents 401 on the preview image 152, and mixes the contents 401 with the preview image 152.

Next, the controller 111 determines whether to store the created blog (operation S317). The controller 111, when receiving a request for storing the created blog, stores the corresponding blog in the blog storage 119 (operation S319). The stored information includes a background ID corresponding to the preview image 152 and information (that can include the features) about the adjusted contents 401. Also, the controller 111 may drive the communication unit 107 and store the background ID and information about the contents 401 in a blog server through WAP, according to the user's request or automatically.

Figure 4:
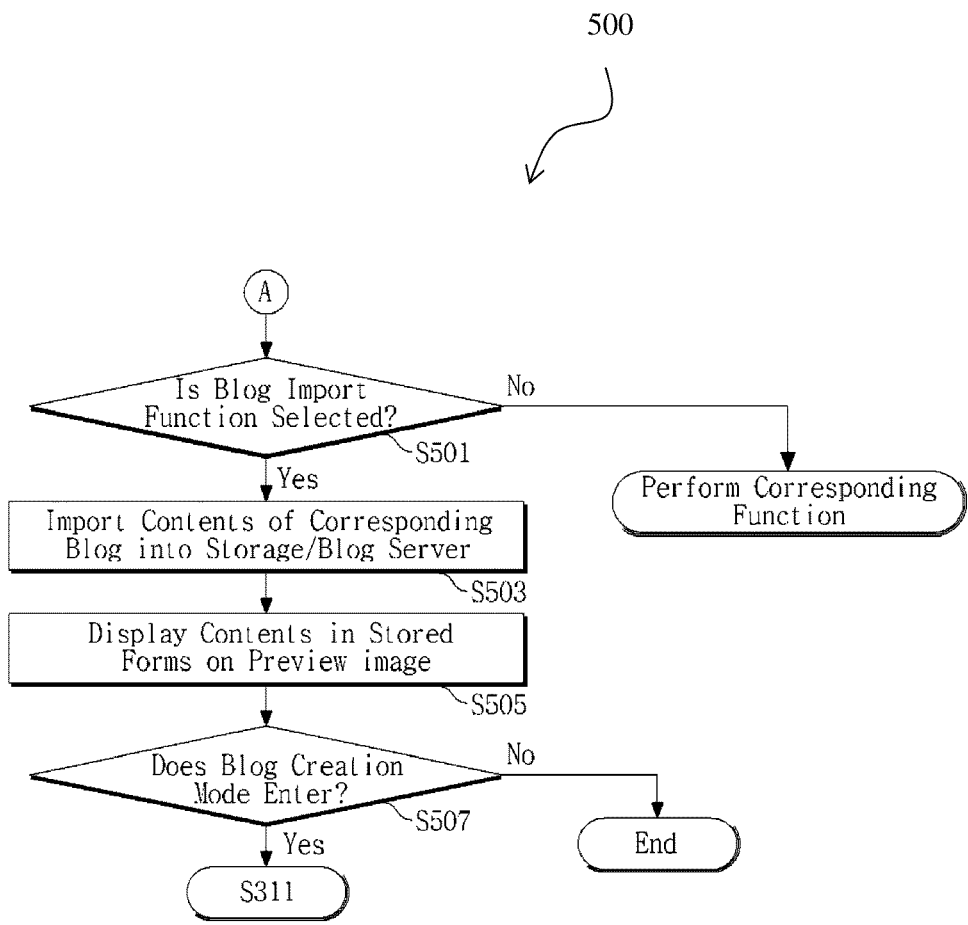
FIG. 4 is a flowchart of an exemplary procedure for importing a blog and blogging.
Figure 5:
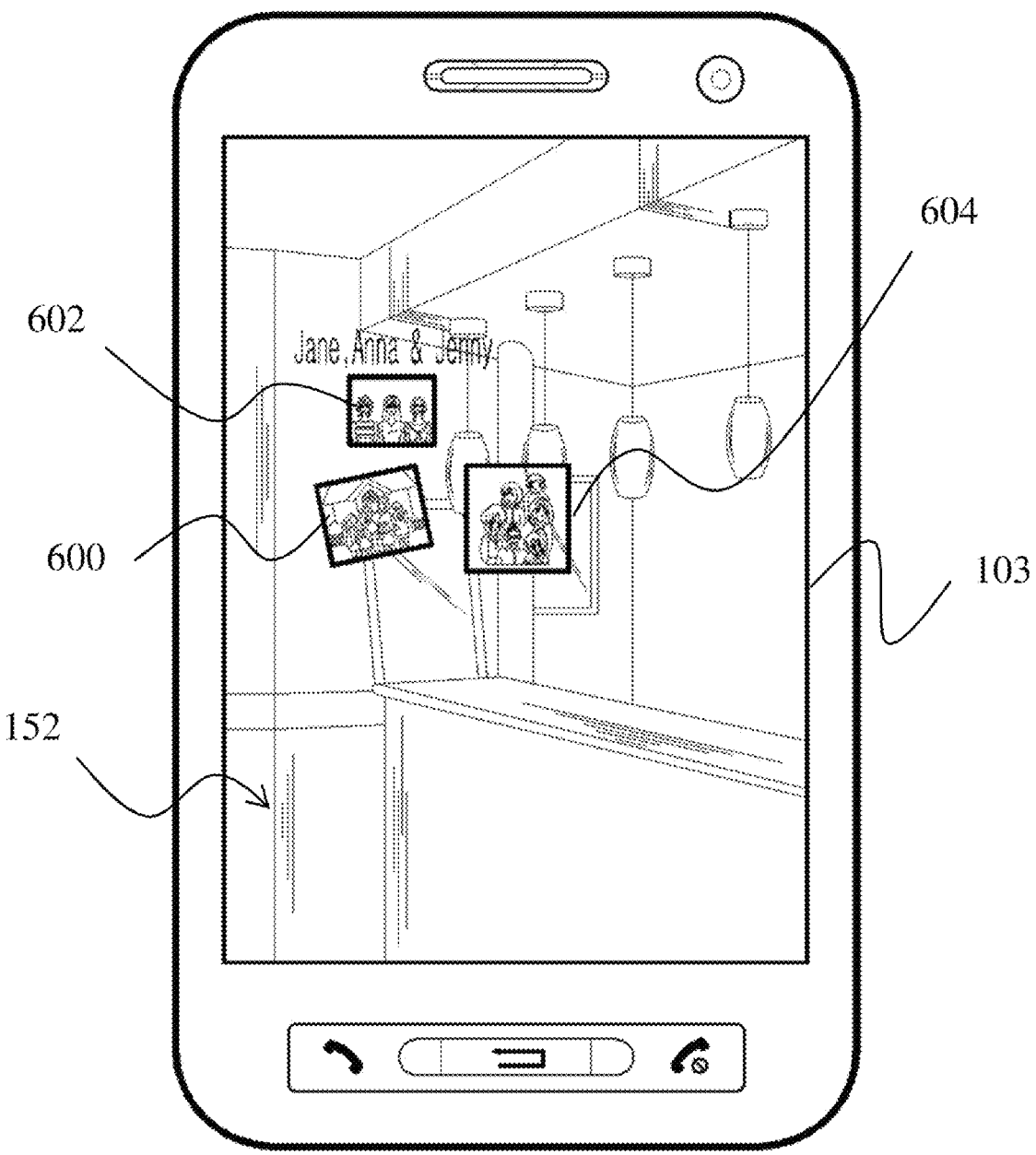
FIG. 5 is a screen shot of an exemplary image displayed on the terminal when a blog is imported.

FIG. 4 is a flowchart of a procedure 500 for importing a blog, and FIG. 5 shows an exemplary image displayed on the display 103 of the terminal 100 when a blog is imported.

Referring to FIGS. 1 and 4, first, if it is determined in operation 5307 of the procedure 300 (FIG. 2) that a stored blog corresponding to a preview image 152 exists, the controller 111 determines whether a blog import function is selected (operation S501). That is, as illustrated in FIG. 3B, if a blog corresponding to the preview image 152 acquired through the camera 101 is found, a user may select a blog import function to import the blog. The blog importing may be performed by selecting the blog import function from among various functions provided as a menu or option when the preview image 152 is displayed. Or, the blog importing may be performed by informing a user of existence of the corresponding blog through a pop-up window, etc. and receiving selection of the blog by the user. Meanwhile, when a stored blog corresponding to the preview image is found, the controller 111, instead of allowing the user to select the blog import function, may import the corresponding blog automatically.

When the blog import function is selected, the controller 111 imports contents of the corresponding blog (operation S503). The controller 111 imports contents of the blog that stores the preview image 152 as a background ID, from the blog storage 119 of the storage 109. At this time, the controller 111 may drive the communication unit 107 to import the corresponding contents information from a blog server through WAP, according to the user's request or automatically.

Next, the controller 111 displays the contents in their stored forms on the preview image 152 (operation S505). An exemplary screen displayed when the contents 600, 602, 604 are imported in their stored forms on the preview image 152 shown in FIG. 3B is shown in FIG. 5. As shown in FIG. 5, the controller 111 displays the corresponding contents 600, 602, 604 in their stored forms on the preview image 152.

Next, the controller 111 determines whether the blog creation mode is selected (operation S507). If the user wants to add more contents to the stored blog, the user may select the blog creation mode to perform operation 5311, as described above.

The method(s) and/or operation(s) described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of blogging using a terminal, the method comprising:
   capturing a preview image through a camera at the terminal;
   recognizing the preview image including acquiring information of the preview image;
   determining whether a stored blog includes background information that is identical to the acquired information of the preview image; and
   if it is determined that stored blog background information is identical to the information of the preview image, importing contents including one or more content items of the stored blog to that uses the preview image as a background and displaying the imported contents on the preview image on a display of the terminal;
   wherein, after acquiring the information of the preview image, further comprising:
   determining whether a blog creation mode is selected;
   if a blog creation mode is selected, receiving selected contents and creating a blog by displaying the selected contents and allowing adjustment of the displayed contents; and
   storing the created blog.

2. The method of claim 1, wherein acquiring the information of the preview image comprises recognizing the preview image through augmented reality (AR) processing.

3. The method of claim 2, wherein acquiring the information of the preview image comprises identifying a marker of the preview image.

4. The method of claim 1, wherein creating the blog further comprises: determining whether contents are selected; if the contents are selected, arranging the selected contents randomly on the preview image; and adjusting at least one of a position, size, and angle of each content item of the contents on the preview image.

5. The method of claim 1, wherein storing the blog comprises storing the information of the preview image and information of the adjusted contents.

6. The method of claim 1, wherein displaying the selected contents on the preview image comprises: displaying the contents in their stored forms on the preview image, determining whether the blog creation mode is selected after displaying the contents, and returning to the creating of the blog if the blog creation mode is selected.

7. A terminal comprising:
   a camera configured to display a preview image;
   a storage medium configured to store contents that includes one or more content items, contents information including at least one of a position, size, and angle of the contents in a predetermined blog, and background information of the predetermined blog; and
   a controller configured to:
   recognize the preview image,
   acquire information of the preview image,
   search the storage medium for background information, and
   if a blog having background information that is identical to the information of the preview image is found in the storage medium, import the blog's contents that uses the preview image as a background, and display the contents of the blog in their stored forms on the preview image;
   wherein the controller further comprises an augmented reality processor, the augmented reality processor comprising:
   a real scene recognizer configured to perform a function of the camera to display the preview image and identify a marker of the preview image;
   a virtual object creator configured to receive position tracking information of the real scene recognizer and create the selected contents as a virtual object; and a mixer configured to mix the preview image with the virtual object.

8. The terminal of 7, wherein the controller is configured to acquire the information of the preview image by identifying the marker of the preview image.

9. The terminal of claim 7, wherein the controller, if a blog creation mode is selected, is configured to create the blog by receiving selected contents, displaying the selected contents and allowing adjustment of the displayed contents.

10. The terminal of claim 9, wherein if the contents are selected, the controller is configured to arrange the selected contents randomly on the preview image.

11. The terminal of claim 9, further comprising an input unit configured to adjust at least one of a position, size, and angle of each content item of the contents on the preview image.

* * * * *